United States Patent
Schimpe

(10) Patent No.: US 7,876,852 B2
(45) Date of Patent: Jan. 25, 2011

(54) MODULATOR DEVICE FOR GENERATING AN OPTICAL TRANSFER SIGNAL MODULATED BY BINARY SIGNAL

(75) Inventor: Robert Schimpe, Ottobrunn (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 317 days.

(21) Appl. No.: 12/281,119

(22) PCT Filed: Mar. 2, 2007

(86) PCT No.: PCT/EP2007/052005

§ 371 (c)(1),
(2), (4) Date: Aug. 28, 2008

(87) PCT Pub. No.: WO2007/099165

PCT Pub. Date: Sep. 7, 2007

(65) Prior Publication Data

US 2010/0245967 A1 Sep. 30, 2010

(30) Foreign Application Priority Data

Mar. 3, 2006 (DE) .................. 10 2006 009 990

(51) Int. Cl.
H04L 27/10 (2006.01)
H03C 1/52 (2006.01)
H04B 10/04 (2006.01)

(52) U.S. Cl. ................ 375/272; 375/303; 375/240; 375/320; 375/334; 398/185; 398/187; 398/192; 398/193; 398/77; 398/81; 398/95; 359/238

(58) Field of Classification Search .............. 398/77, 398/81, 95, 183, 185, 187, 192, 193; 375/240, 375/241, 268, 272, 303, 320, 334; 359/238
See application file for complete search history.

(56) References Cited

U.S. PATENT DOCUMENTS

| 6,592,274 B2 * | 7/2003 | Kahn et al. ............... 398/141 |
| 7,577,367 B2 * | 8/2009 | Way .......................... 398/183 |
| 2003/0002121 A1 * | 1/2003 | Miyamoto et al. .......... 359/183 |

(Continued)

FOREIGN PATENT DOCUMENTS

EP 0825733 A2 2/1998

(Continued)

OTHER PUBLICATIONS

IEEE Photonics Technology Letters, 2006 vol. 18, issue 02 pp. 385-387: "Chirp-managed directly modulated Laser (CML)", by Y. Matsui et al. AZNA Corporation, USA).

(Continued)

*Primary Examiner*—Evelyn A. Lester
(74) *Attorney, Agent, or Firm*—Laurence A. Greenberg; Werner H. Stemer; Ralph E. Locher

(57) ABSTRACT

According to the invention, a very narrow-band transfer signal (LS) is generated by serially connecting a frequency modulator (2) and an amplitude modulator (4). The frequency modulator (2) is operated at a modulation index which at least largely suppresses the carrier signal (TS) while the amplitude modulator (4) suppresses the broadband portion of the spectrum by fading out the transfer signal (LS) during frequency-shift keying.

10 Claims, 3 Drawing Sheets

U.S. PATENT DOCUMENTS

2003/0043931 A1* 3/2003 Fullerton et al. ............ 375/295

FOREIGN PATENT DOCUMENTS

| GB | 2237469 A | 5/1991 |
|---|---|---|
| WO | WO-2005/084268 A2 | 9/2005 |

OTHER PUBLICATIONS

European Conference on Optical Communication 2005 (ECOC 2005), paper Th2.2.5: "Initial Phase Control Method for High-Speed External Modulation in Optical Minimum-Shift Keying Format", by T. Sakamoto et al.

IEEE Photonics Technology Letters, 1998 vol. 10, issue 8, pp. 1159-1161: "Prechirped Duobinary Modulation" by Anders Djupsjöbacka.

* cited by examiner

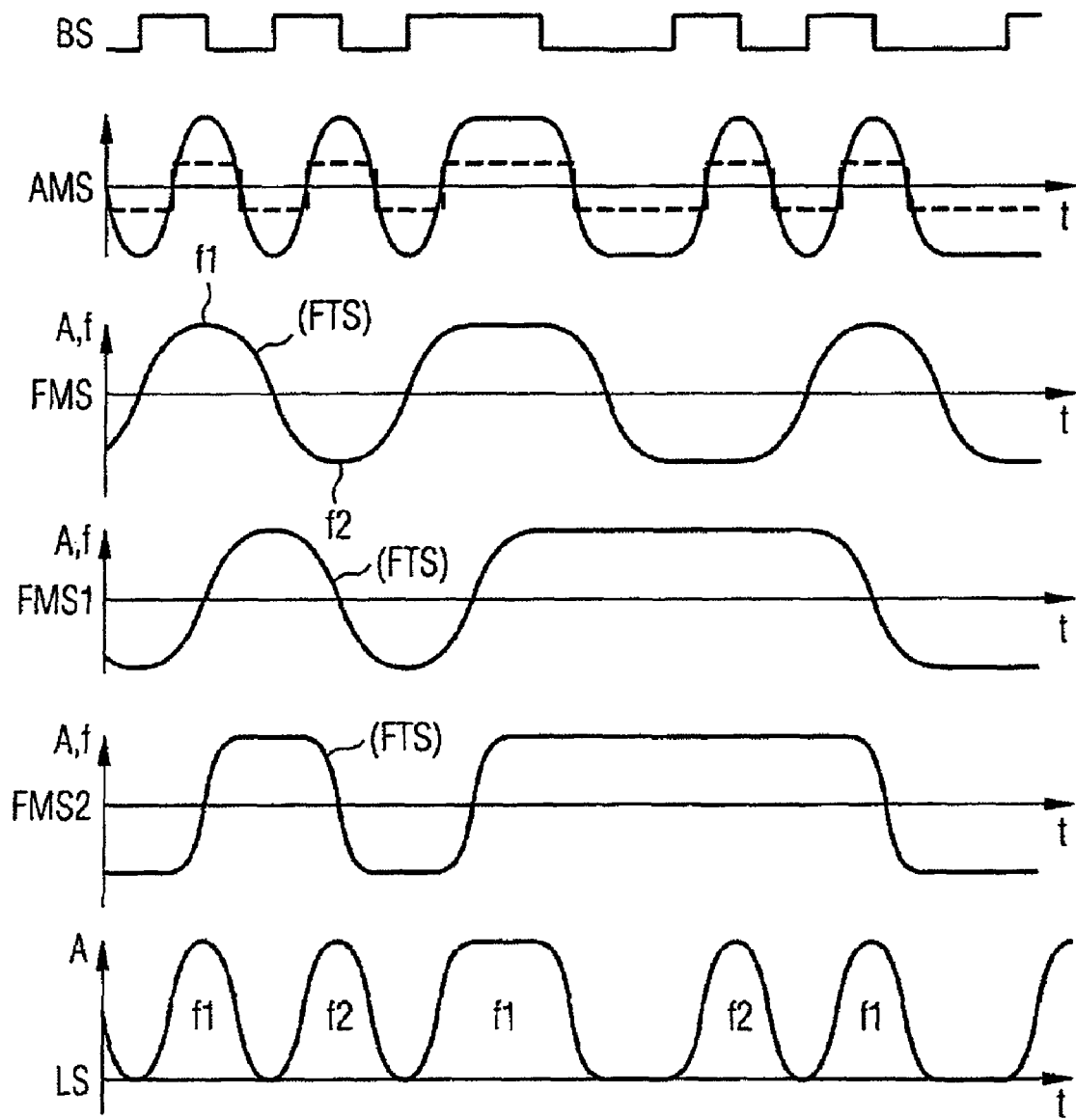

US 7,876,852 B2

MODULATOR DEVICE FOR GENERATING AN OPTICAL TRANSFER SIGNAL MODULATED BY BINARY SIGNAL

CLAIM FOR PRIORITY

This application is a national stage application of PCT/EP2007/052005, filed Mar. 2, 2007, which claims the benefit of priority to German Application No. 10 2006 009 990.7, filed Mar. 3, 2006, the contents of which hereby incorporated by reference.

TECHNICAL FIELD OF THE INVENTION

The invention relates to a modulator device for generating an optical transfer signal modulated by a binary signal.

BACKGROUND OF THE INVENTION

A laser having a downstream amplitude modulator (intensity modulator) generates an optical spectrum with a spectral line at the carrier frequency and a bandwidth which is wider than the bandwidth of the information signal. Such an emission spectrum reduces the amount of information which can be transferred overall in a wavelength-division multiplex system. On account of the non-linear properties of the transmission fiber, a wider bandwidth results in greater distortion of the transfer signal. One method for reducing the bandwidth is duobinary coding. Such a method is described in IEEE Photonics Technology Letters, 1998, Vol. 10, Issue 8, pp. 1159-1161: "Prechirped Duobinary Modulation" by A. Djupsjöbacka (Ericsson Components, Sweden). However, this type of coding is very complicated.

SUMMARY OF THE INVENTION

The invention discloses a modulation device which can be implemented in a simple manner and is intended to generate a high-quality transfer signal.

One advantage of the invention is that the optical carrier signal is frequency-modulated such that the optical carrier is suppressed at least to a large extent. The drive signal for the frequency modulator is pre-coded such that frequency shift keying is respectively carried out in the case of a 10 or 01 change. This frequency shift keying is required in the case of 101 sequences. In contrast, in the case of longer 11 sequences or 00 sequences, no frequency shift keying is carried out. An amplitude modulator which suppresses the broad signal spectrum produced during frequency shift keying is connected downstream of the frequency modulator. As a result, further spectral lines, apart from the spectral lines adjacent to the original carrier frequency, disappear in the case of a 1010 signal sequence. The spectrum remains narrow even in the case of a real data signal.

The circuit can be constructed in a particularly cost-effective manner if a directly modulated laser is used as the source of the carrier signal and as the frequency modulator.

A suitably designed drive circuit makes it possible to compensate for asymmetry in the amplitude, to optimize the transfer signal with regard to a desired chirp, and to compensate for delay time differences.

BRIEF DESCRIPTION OF THE DRAWINGS

The invention is described in more detail using figures, in which:

FIG. 3 shows a timing diagram.

DETAILED DESCRIPTION OF THE INVENTION

Figure 1:
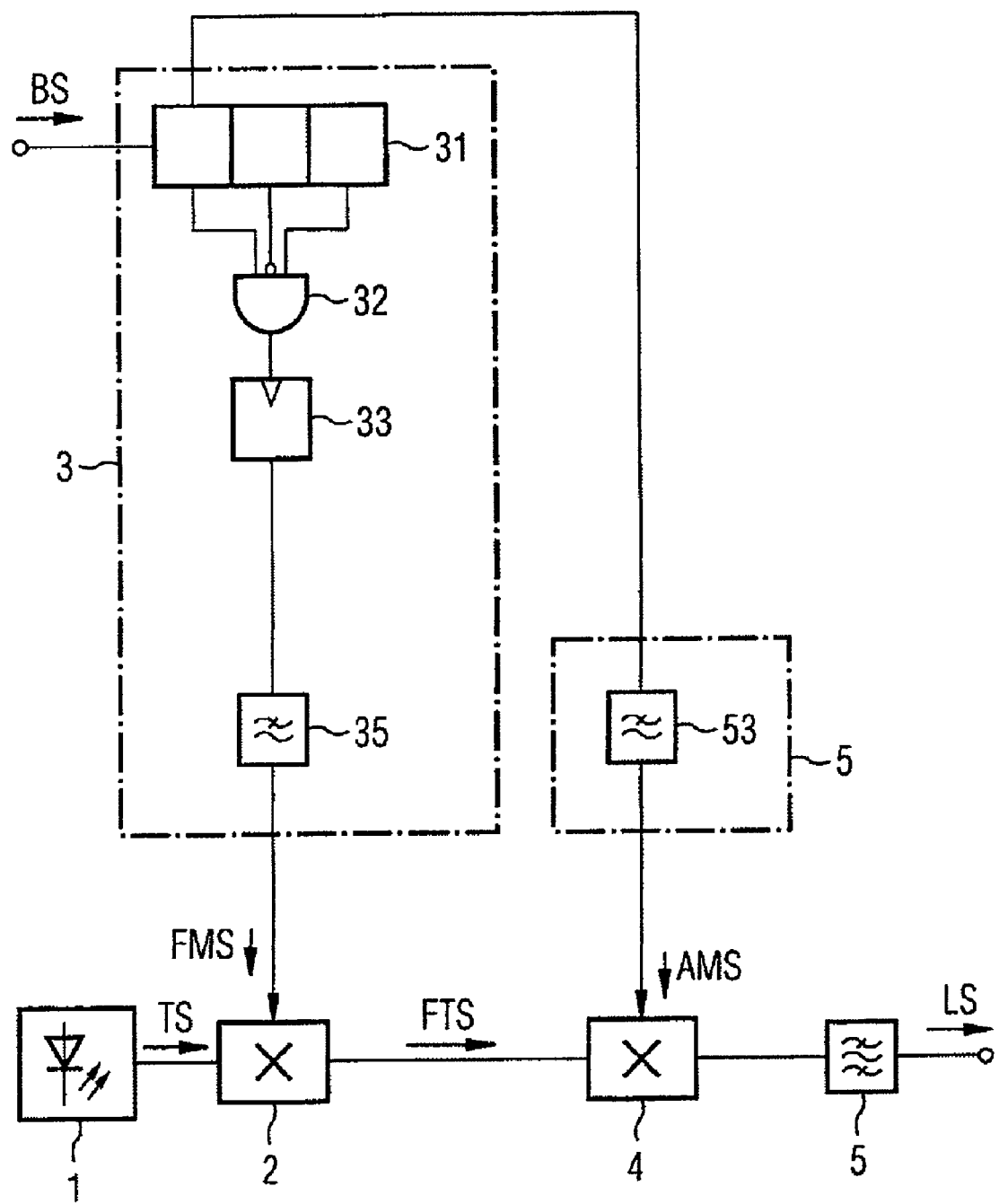
FIG. 1 shows a first exemplary embodiment of the invention.

FIG. 1 shows a block diagram of the modulator. A carrier frequency signal TS which is supplied to a frequency modulator 2 is generated by a laser 1 or another signal source. The frequency-modulated output signal FTS from said frequency modulator is supplied to an amplitude modulator 5 which modulates on a binary signal, the data, and thus generates a transfer signal LS. The latter is emitted via a bandpass filter 6, if necessary. The frequency modulator is controlled by the binary signal using a first drive circuit 3 and the amplitude modulator is controlled by the binary signal using a second drive circuit.

The method of operation of the modulator device is now explained in more detail using a timing diagram which is illustrated in FIG. 3. The binary signal BS is illustrated in the first row of the timing diagram. It begins with a 10101 sequence which gives rise to the broadest spectrum in the case of modulation. The frequency modulator 2 carries out frequency shift keying by the first drive circuit 3 for each 10 sequence. The first drive circuit 3 includes a precoder 31, 32 having a shift register 31 and a logic circuit 32. The binary signal is written into the shift register 31. The illustration of the binary signal BS relates to the output of the first flip-flop of the shift register 31 (the associated clock signal has not been illustrated). The occurrence of a 10 sequence is checked in the logic circuit 32. If this sequence occurs, for example after the first logic 1 or at the beginning of the first completely illustrated logic zero, a flip-flop 33 is triggered, with the result that its initial state changes. A frequency modulation signal FMS, which gives rise to frequency shift keying from the frequency f1 to f2, is generated thereby by a first filter arrangement 35 which generally also carries out electrical matching to the frequency modulator. Frequency shift keying between f2 and f1 is carried out again in the case of the next 10 combination, which is then repeated in the case of further 10 sequences. The frequency profile of the frequency-modulated signal FTS corresponds to the profile of the amplitude A of the frequency modulation signal. The modulation index is intended to be between 1.8 and 2.6; the carrier is suppressed in an optimum manner at approximately 2.4. An optimum signal quality is achieved, in particular, with a modulation index of approximately 2.0.

The third row shows a sinusoidal frequency modulation signal FMS which is at half the fundamental frequency of the binary signal in the case of a 10 sequence. It is shaped (if necessary) by the first filter arrangement 35 which also provides the required drive voltage for the frequency modulator in this case.

The fourth row illustrates a frequency modulation voltage FMS1 for an advantageous variant of the modulation device, in which unnecessary frequency shift keying is avoided. Frequency shift keying is carried out whenever there is a 101 sequence. For this purpose, a further input signal is supplied to the logic circuit via the dashed connection in FIG. 1.

In the fifth row, frequency shift keying is no longer carried out by a sinusoidal frequency modulation voltage but rather takes place in the half period before it. For the rest, the FM modulation voltage FMS2 corresponds to the modulation voltage in the third row.

The binary signal is impressed in the amplitude modulator 4. It takes place for the correct temporal assignment of an amplitude modulation signal AMS to the frequency modulation signal or at the times during which frequency shift keying is carried out. The second row shows a square-wave (dashed) modulation signal, which, apart from a necessary time delay, corresponds to the binary signal BS, and the sinusoidal amplitude modulation signal AMS. During frequency shift keying, the frequency-modulated signal FTS must be suppressed as far as possible and the amplitude of the transfer signal LS must thus be zero as far as possible so that the interfering frequency components are masked. This is the case with a combination of the frequency modulation signal FMS and the amplitude modulation signal AMS. The time function in the lowest, sixth row shows the amplitude profile of the transfer signal for this combination of sinusoidal amplitude modulation and frequency modulation FMS.

Figure 2:
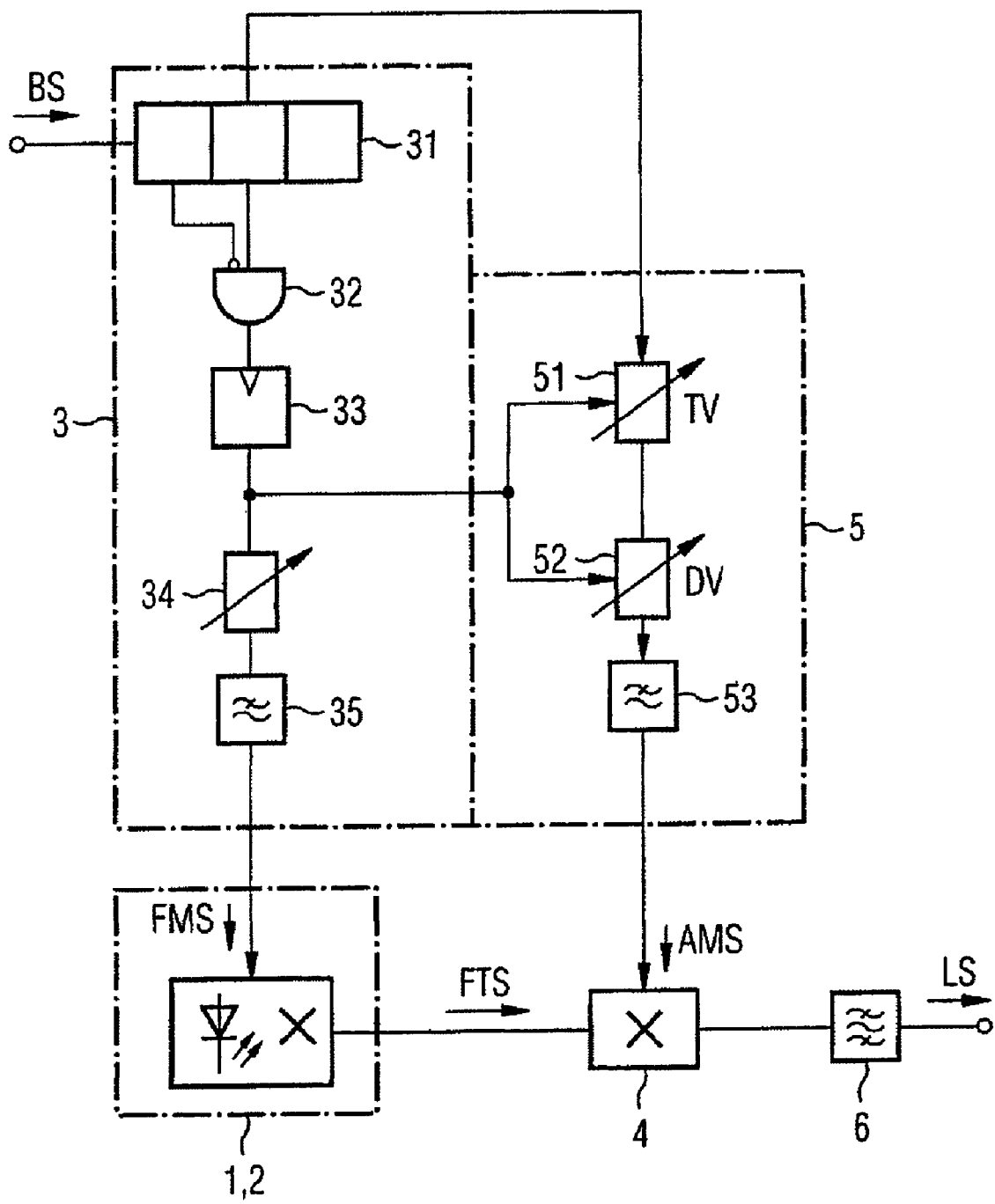
FIG. 2 shows a variant of the invention which can be implemented in a cost-effective manner.

If, in contrast, the variant is implemented with frequency shift keying for 101 sequences according to row 4 or 5, the amplitude modulation voltage is delayed by the duration of one bit, as illustrated in FIG. 2. It goes without saying that the delay times of lines and components is taken into account for the high data rates.

FIG. 2 shows a variant of the modulator device, in which, instead of an external frequency modulator, a directly frequency-modulated laser 1, 2 is used as the generator of the carrier signal TS and as the frequency modulator. However, amplitude modulation also occurs in this case and should be compensated for. In order to compensate for asymmetry in the different amplitudes during frequency shift keying and also to compensate for the delay times caused by dispersion of the transmission fiber, the first drive circuit includes an asymmetrical or controllable first delay element 34 and the second drive circuit 5 includes an asymmetrical or controllable second delay element 51 and a controllable attenuation element 52. The delay elements make it possible to compensate for the different delay times of a transmission path for both shift keying frequencies f1 and f2 (this may also be carried out at the receiving end); the controllable attenuation element 52 compensates for the different amplitudes of the frequency-modulated signal FTS. These functions which are illustrated only basically here can be implemented using numerous circuit variants.

The invention claimed is:

1. A modulator for generating an optical transfer signal modulated by a binary signal, comprising:
   - a frequency modulator which modulates an optical carrier signal;
   - a precoder which is supplied with the binary signal and uses a first drive circuit to control frequency shift keying by the frequency modulator when a 1-0 sequence or a 0-1 sequence of the binary signal;
   - an amplitude modulator which is supplied with a frequency-modulated signal by the frequency modulator; and
   - a second drive circuit for the amplitude modulator, which circuit is supplied with the binary signal and suppresses the frequency-modulated signal generated by the frequency modulator during frequency shift keying and generates the optical transfer signal with a narrow spectrum.

2. The modulator as claimed in claim 1, wherein the first drive circuit is designed such that the frequency-modulated signal has a modulation index of between 1.8 and 2.6.

3. The modulator as claimed in claim 2, wherein the precoder is designed such that frequency shift keying is carried out during a 1-0-1 sequence.

4. The modulator as claimed in claim 1, wherein at least one of the first drive circuit and the second drive circuit are designed such that driving is effected using sinusoidal modulation signals.

5. The modulator as claimed in claim 1, wherein the first drive circuit is designed such that frequency shift keying is carried out within the duration of one bit.

6. The modulator as claimed in claim 1, wherein at least one of the first drive circuit and the second drive circuit include a controllable delay element to compensate for the different propagation speeds of the frequency-modulated signals.

7. The modulator as claimed in claim 1, wherein a directly modulated laser is used to generate the carrier signal and is simultaneously used as the frequency modulator.

8. The modulator as claimed in claim 1, wherein the first drive circuit includes a first filter arrangement for optimum pulse shaping.

9. The modulator as claimed in claim 1, wherein the second drive circuit drives the amplitude modulator differently on the basis of the frequency of the signal emitted by the frequency modulator, such that the amplitude of the transfer signal remains the same when a logic 1 is emitted.

10. The modulator as claimed in claim 1, further comprising:
    - a bandpass filter for eliminating signal elements with undesirable frequencies is connected downstream of the amplitude modulator.

* * * * *